(12) United States Patent
Chowdhury et al.

(10) Patent No.: US 11,980,309 B2
(45) Date of Patent: May 14, 2024

(54) SMART UNATTENDED HOME DELIVERY BOX

(71) Applicant: MARGENTO R&D D.O.O., Maribor (SI)

(72) Inventors: Amor Chowdhury, Kamnica (SI); Milos Urbanija, Izlake (SI); Luka Goste, Izlake (SI); Dalibor Igrec, Maribor (SI)

(73) Assignee: Margento R&D D.O.O., Maribor (SI)

( * ) Notice: Subject to any disclaimer, the term of this patent is extended or adjusted under 35 U.S.C. 154(b) by 746 days.

(21) Appl. No.: 17/264,099

(22) PCT Filed: Jul. 30, 2018

(86) PCT No.: PCT/EP2018/070590
§ 371 (c)(1),
(2) Date: Jan. 28, 2021

(87) PCT Pub. No.: WO2020/025098
PCT Pub. Date: Feb. 6, 2020

(65) Prior Publication Data
US 2021/0298508 A1     Sep. 30, 2021

(51) Int. Cl.
*A47G 29/14*     (2006.01)
*G07C 9/00*      (2020.01)
(Continued)

(52) U.S. Cl.
CPC ....... *A47G 29/141* (2013.01); *G07C 9/00896* (2013.01); *H04L 9/3239* (2013.01);
(Continued)

(58) Field of Classification Search
CPC ............ A47G 29/141; A47G 2029/145; A47G 2029/149; G07C 9/00896;
(Continued)

(56) References Cited

U.S. PATENT DOCUMENTS 5,774,053 A * 6/1998 Porter .................. A47G 29/141
340/568.1
6,323,782 B1 * 11/2001 Stephens ............ G07C 9/00571
340/5.73
(Continued)

FOREIGN PATENT DOCUMENTS

EP           3333810 A1    6/2018
WO     WO2017091685 A1    6/2017
WO        2018116282 A1   6/2018

*Primary Examiner* — Nam V Nguyen
(74) *Attorney, Agent, or Firm* — Dickinson Wright PLLC; Robert L. Stearns

(57) ABSTRACT

A secure locker box is provided including a basic box (100) with a door enclosing a storage area, and a lock system for locking the door, the lock system including a processing unit (201), an electro mechanical door lock (202), and a wireless communication module (300). The processing unit (201) is adapted to receive a wakeup signal via the wireless communication module (300); send a request for unlocking the electro mechanical door lock (202) and opening the door; in response to receiving an unlock confirmation message, actuate the electro mechanical door lock (202) such that it opens the door; recognize closing of the door and locking the electro mechanical door lock (202) and in response sending a door closed and door lock locked confirmation message. A method for handling the secure locker box comprises receiving the confirmation message by a remote locker center (400) and writing a confirmation to a blockchain to ensure authenticity.

8 Claims, 8 Drawing Sheets

Figure 1:
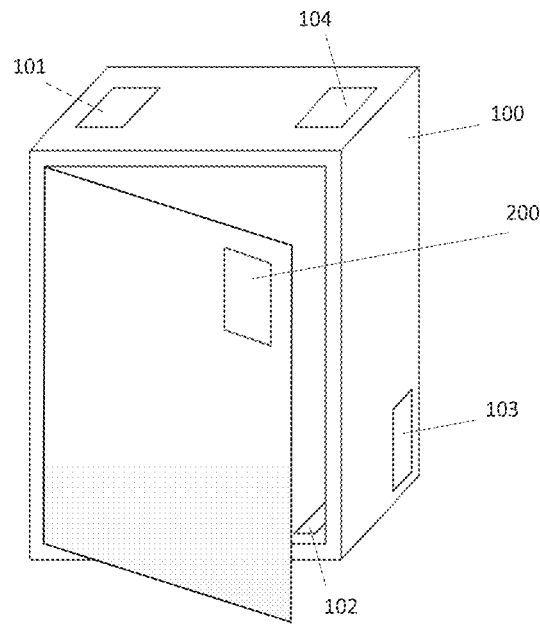

(51) Int. Cl.
 *H04L 9/00* (2022.01)
 *H04L 9/32* (2006.01)
 *H04W 12/63* (2021.01)
 *H04W 52/02* (2009.01)

(52) U.S. Cl.
 CPC ....... *H04W 12/63* (2021.01); *H04W 52/0229* (2013.01); *A47G 2029/145* (2013.01); *A47G 2029/149* (2013.01); *H04L 9/50* (2022.05)

(58) Field of Classification Search
 CPC ...... G07C 2009/00793; G07C 9/00912; H04L 9/3239; H04L 9/50; H04L 9/321; H04L 2209/80; H04L 9/3226; H04W 12/63; H04W 52/0229; H04W 12/00; G06Q 10/0833
 USPC .................................................. 340/5.73, 5.7
 See application file for complete search history.

(56) References Cited

U.S. PATENT DOCUMENTS

| | | | |
|---|---|---|---|
| 7,710,275 B2* | 5/2010 | Phillips | G06Q 10/087 340/572.7 |
| 9,418,495 B2* | 8/2016 | Mackin | G07C 9/215 |
| 10,096,183 B2* | 10/2018 | Nitu | G07F 9/001 |
| 10,131,478 B2* | 11/2018 | Maser | E05B 65/52 |
| 11,222,303 B2* | 1/2022 | Shaw | G06Q 10/0833 |
| 2009/0166403 A1* | 7/2009 | Volpe | G07C 9/00912 235/375 |
| 2017/0147975 A1* | 5/2017 | Natarajan | A47G 29/141 |
| 2017/0286905 A1 | 10/2017 | Richardson et al. | |
| 2018/0144642 A1* | 5/2018 | High | H04W 4/021 |
| 2018/0177319 A1* | 6/2018 | Willis | G06Q 10/1097 |
| 2018/0181904 A1 | 6/2018 | Wilkinson et al. | |
| 2018/0189730 A1 | 7/2018 | Wilkinson et al. | |

* cited by examiner

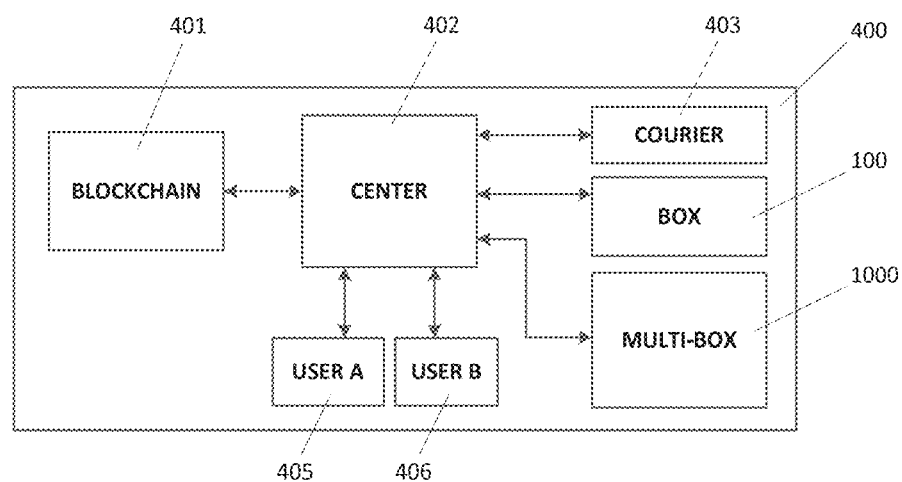
Fig. 4
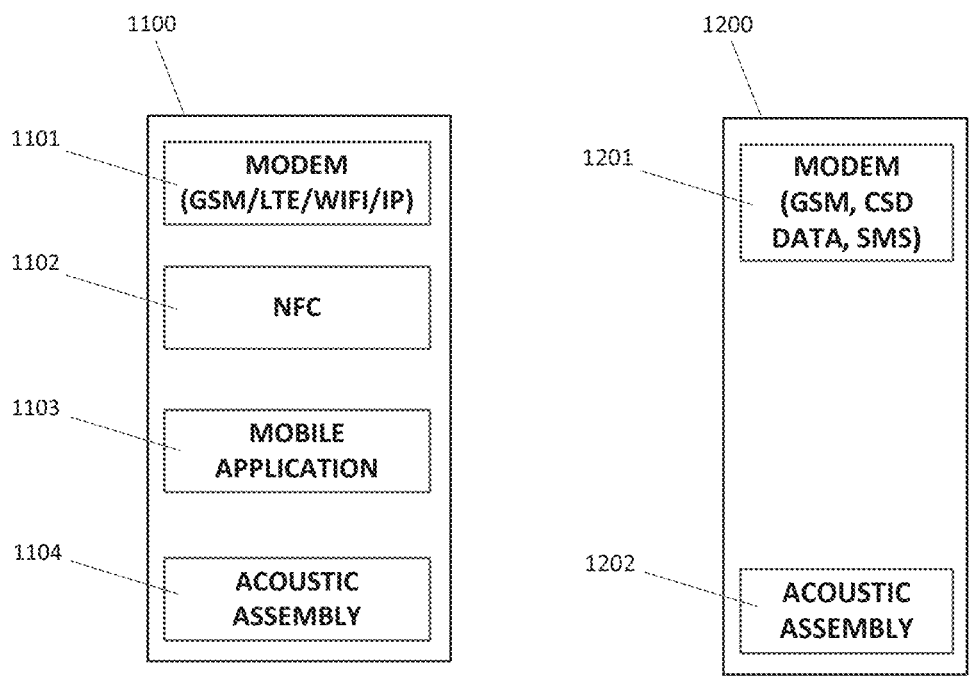
Fig. 5
Fig. 6

SMART UNATTENDED HOME DELIVERY BOX

BACKGROUND

1. Technical Field

The present invention belongs to the field of supply chain systems and extends upon existing logistics service technologies. The invention relates to a novel system for managing unattended home delivery of small- and mid-sized items to online and other remote shoppers.

2. Related Art

Substantial and ever stronger growth of e-commerce comes with great challenges in logistics associated with the goods bought remotely and then delivered to their buyers. Driven both by the need to improve services for customers and to make it more cost-effective, substantial efforts have been invested into improving delivery solutions in the past decades.

While the logistical solutions have been turned into well-oiled systems that now have an infrastructural role in world trade and business, certain areas of the delivery chain remain plagued with inefficiencies. We believe that the most challenging amongst these are the last few meters of the delivery of a product, which may likely have passed thousands of kilometres beforehand.

SUMMARY

It is precisely overcoming the last-meter barrier that stands at the centre of our invention. Questions of end-customer convenience take the most central role there, differentiating this very last step from all the prior ones in delivering a product. Businesses taking part in e-commerce logistics have their schedules and operate in accordance with preset procedures. The buyer waiting for her latest pair of designer sandals, on the other hand, has none of that. It is the end-customer's daily life that has to be contended with in this segment.

Extensive research suggests that a very substantial share of home deliveries fails to be completed the first time around. The resulting missed deliveries lead to prolonged effective delivery times, additional work and stress, extra cost, poor user experience, and an overall decrease in efficiency of the logistics involved in remote purchases of goods. Our proposition eliminates the need for the recipient to be physically present at home at the time of the delivery, while ensuring that a secure drop-off of the goods is still possible. The solution keeps the process perfectly secure, tracked and convenient for all the parties involved. To achieve this goal we build on and around a well thought-out symbiosis of certain very basic elements, such as a lockable delivery bin, a set of advanced technologies and, lastly, the infrastructure already in place throughout our target markets.

The invention we hereby propose combines several key elements into a functional system, as elaborated in full detail here below. These, when combined, form the basis of a highly-capable system and give rise to certain marketable products as well as whole new business models in the home delivery sector.

Smart Unattended Home Delivery Box

The proposed system provides an efficient method of making secure home deliveries of small- and mid-sized items in various settings. Be it to individual houses or large multi-apartment buildings, configurations are largely adaptable to the available space, infrastructure availability and other factors. The Smart Unattended Home Delivery Box (hereafter: the Box) has several adaptations available to cater specific placements, however it should in all cases be firmly and securely installed at a convenient location right at or very close to the home of its owner and principal user. Free physical access to the device itself is required for all agents wanting to interact with our proposed device.

Interaction with the Box device is performed using a smart mobile device. This applies to all agents, be it the couriers depositing items as part of their goods delivery or the remote buyers collecting items as their final recipients. Agent's smart mobile device is used to obtain and transfer at close proximity the authorization required to physically unlock the Box and interact with it in general, regardless of whether parcel drop-off by the courier or parcel pick-up by the recipient is taking place. On the other hand, all user notifications are delivered to each agent, be it courier or recipient, using their respective smart mobile devices. These may include real-time delivery authorization requests, delivery notifications, delivery confirmations and similar.

A wide range of communication channels is supported in user-to-device interaction, subject to exact specifications of the Box and the capabilities of the smart device involved. The Box can optionally be actively connected to a cloud-based back-end facility, using either of the available communication means (active approach), or it can rely solely on the communication link provided by the agent's connected smart mobile device (passive approach). Seamless coexistence of both approaches is supported, with passive approach always remaining available as backup should any communication issues appear with the primary, active approach.

The basic addition in ensuring reliability, security and mutual trust in the entire system between the »Courier« and the recipient or »User« is the use of blockchain technology, which eliminates the need for additional intermediaries and thus significantly reduces the costs and the time of individual transaction (authorisation of another recipient, delivering the package, taking over the package, etc.). It uses the core of this technology, which is a decentralized system in which several user systems confirm the same information, thus preventing an individual user and third persons from arbitrarily and retroactively modifying the content of recorded transactions, which allows for permanency and stability of entered data. It also provides an extremely transparent system, as each data block in the chain stores a copy of updated and consistent data on performed transactions, with this information being available to all users.

Box

The presented solution (100) is a comprehensive system, which enables delivery services to deliver a package to a specific user without physical presence of the latter. The reference numerals correspond to embodiments illustrated in the Figures described below and the ensuing detailed description. The casing may preferably be compact and waterproof, and due to its characteristics capable of protecting its contents from external weather conditions.

A subsystem (solar cell) »System for energy harvesting in storage« (101) may be installed on the casing, where it charges the internal battery and ensures electrical energy supply for other segments through the power supply unit.

The casing may also include connection voltage clips or »External power supply« (103), which (optionally) enable connection of additional external power supply. This allows for the system to operate in places where sunlight is not available.

Inside the casing there is an optional »Sensors system« (102), which enables different functions, such as weighing, taking photographs, and other modes of acquiring data on the inserted content or delivery. The active part of the Box (100) is the central processing unit »Lock system« (200), which functions with an internal CPU processor (201). It manages the operation of all system segments, i.e.: »System for energy harvesting in storage« (101), »Sensors system« (102), »External power supply« (103) and »Active Communication« (104). It also locks and unlocks the »Electro Mechanical Lock« (202). It communicates with the »Courier« (403) and/or the »User« (405) contactlessly, using the »Proximity Communication Interface« (300) module, or wirelessly through the communication interface »Active Communication« (104). The sensor system may further include means for enabling automatic identification of the package in the Box (100), such as a RFID reader for reading RFID tags provided on a package or a similar technology for automatic proximity identification.

The communication module »Active Communication« (104) may use currently available wireless technology (e.g. GSM/3G/LTE network, direct IP network, WiFi, Lora, LoRaWAN, etc.) to enable communication with communication interfaces of the back-end system (400) or directly with the »Courier« (403) and/or the »User« (405).

The »Proximity Communication Interface« (300) includes communication interfaces, which enable contactless communication with the »Courier« (403) and/or the »User« (405). The microphone which may be a part of the »Audio System« (301) enables reception of a sound token, which is generated in the smart mobile device of the »Courier« (403) and/or the »User« (405).

An NFC module »Contactless« (304) enables contactless communication with the NFC module of the User's smart mobile device. A serial port »Serial Communication« (306) expands the universality of the master device »Lock system« (200), as different external sensors, actuators or modules (e.g. temperature, humidity, air pressure and weight sensors, video capturing, different controls, etc.) can be connected to it. A »Smart Optical Tag« (302) enables two-way communication using the camera and the flash of the User's smart mobile device. A »Proximity Transceiver« (305) with the help of ZigBee, Bluetooth or another similar wireless interface also enables communication with the User's smart mobile device. The »Smart Optical Tag« (303) enables generation of dynamic QR codes and thus sending information to the User's smart mobile device.

Multi-Box

The presented solution (1000) is a flexible structure of a large number of mailboxes (100), which form an independent whole. The number of the mailboxes can be determined freely, and depends on the needs of users. The Box (100) is usually used in single-dwelling houses, whereas Multi-Box (1000) is used in multi-dwelling houses or apartment blocks. Individual Box (100) components can be added as needed. This means that only one »Active Communication« (104) and one (optional) »External power supply« (103) are needed, while each Box (100) within a Multi-Box (1000) has its own other components.

Server System

At the core of the system (400) is a back-end software solution residing on a server system, which can also be installed on a server cloud »Center« (402), controlling the entire operation. Introducing blockchain (401) technology is at the core of this decentralized system in which several user systems confirm the same information, thus preventing all persons involved from arbitrarily and retroactively modifying the content of recorded transactions, which allows for permanency and stability of entered data. Each block of the blockchain includes the cryptographic hash of the prior block in the blockchain, linking the two. The linked blocks form a chain. This iterative process confirms the integrity of the previous block, all the way back to the original genesis block. The locker system is specific in that it uses blockchain technology (401) to ensure authenticity in recording key events, such as authorisation of another user, package delivery, package take-over, etc., for a locker box, which in itself enables the use of Smart Contracts and all related functional advantages.

THE DRAWINGS

Figure 2:
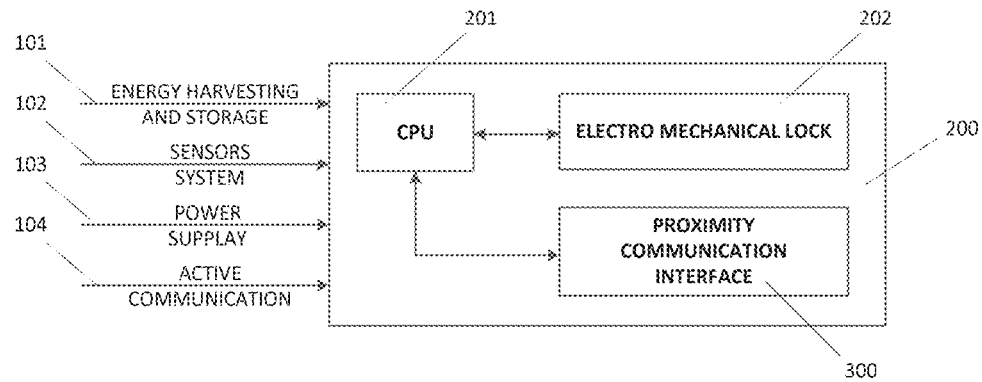
Figure 3:
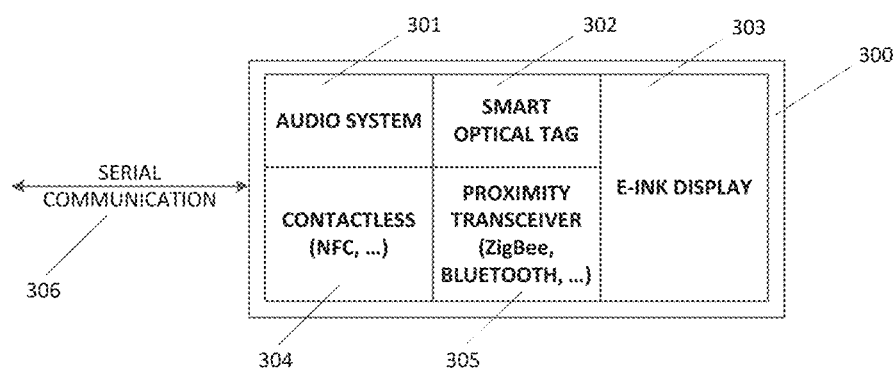
Figure 7:
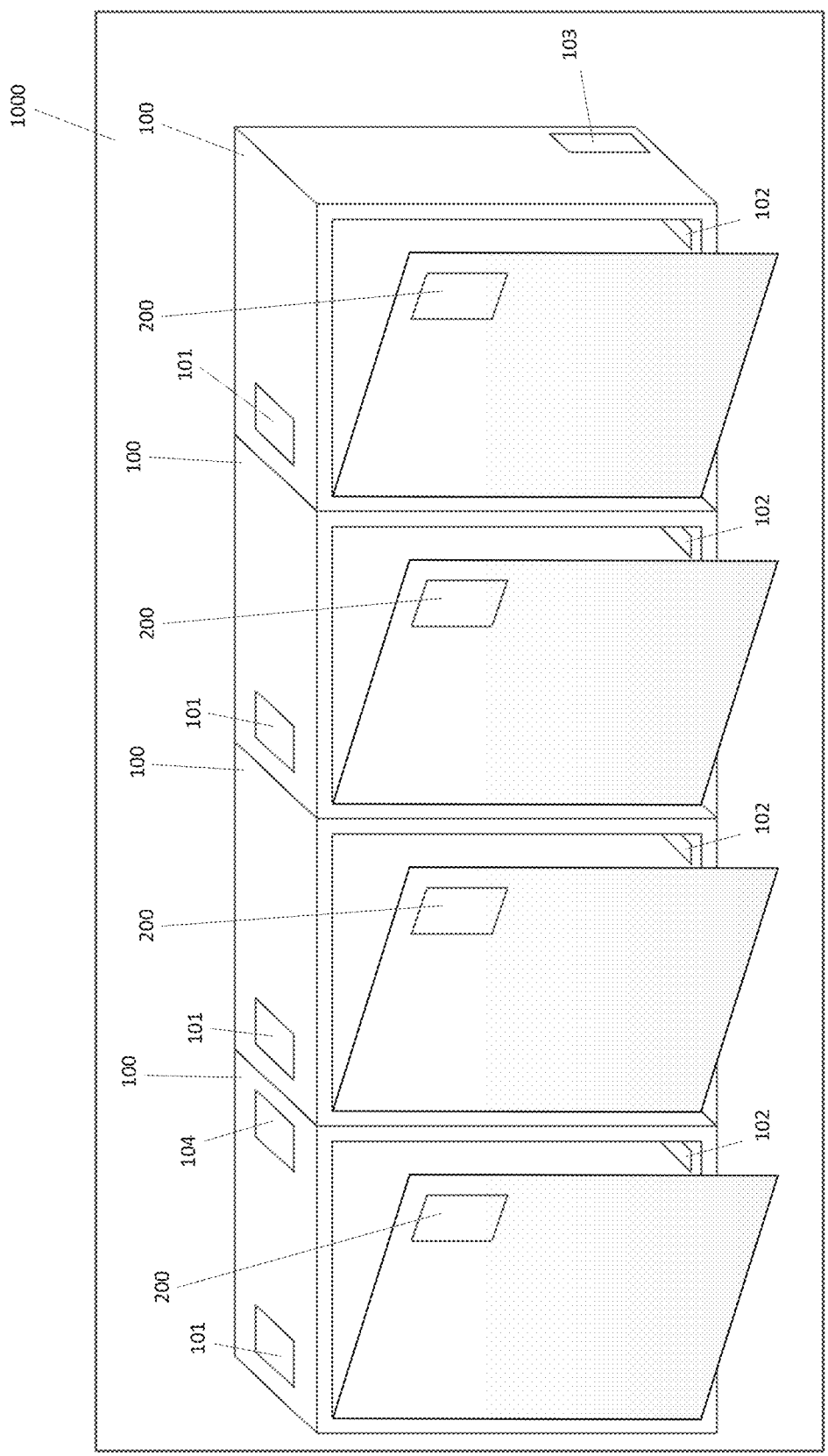
Figure 8:
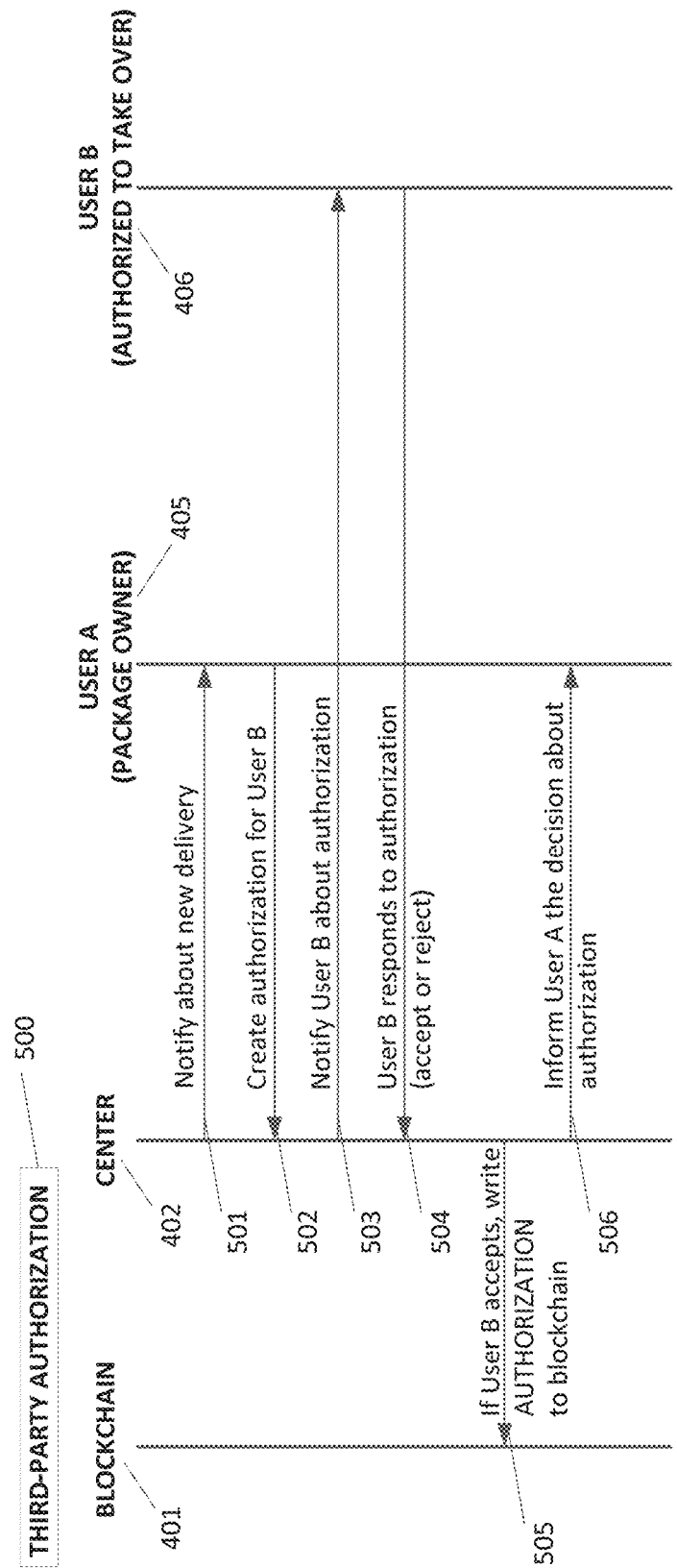
Figure 9:
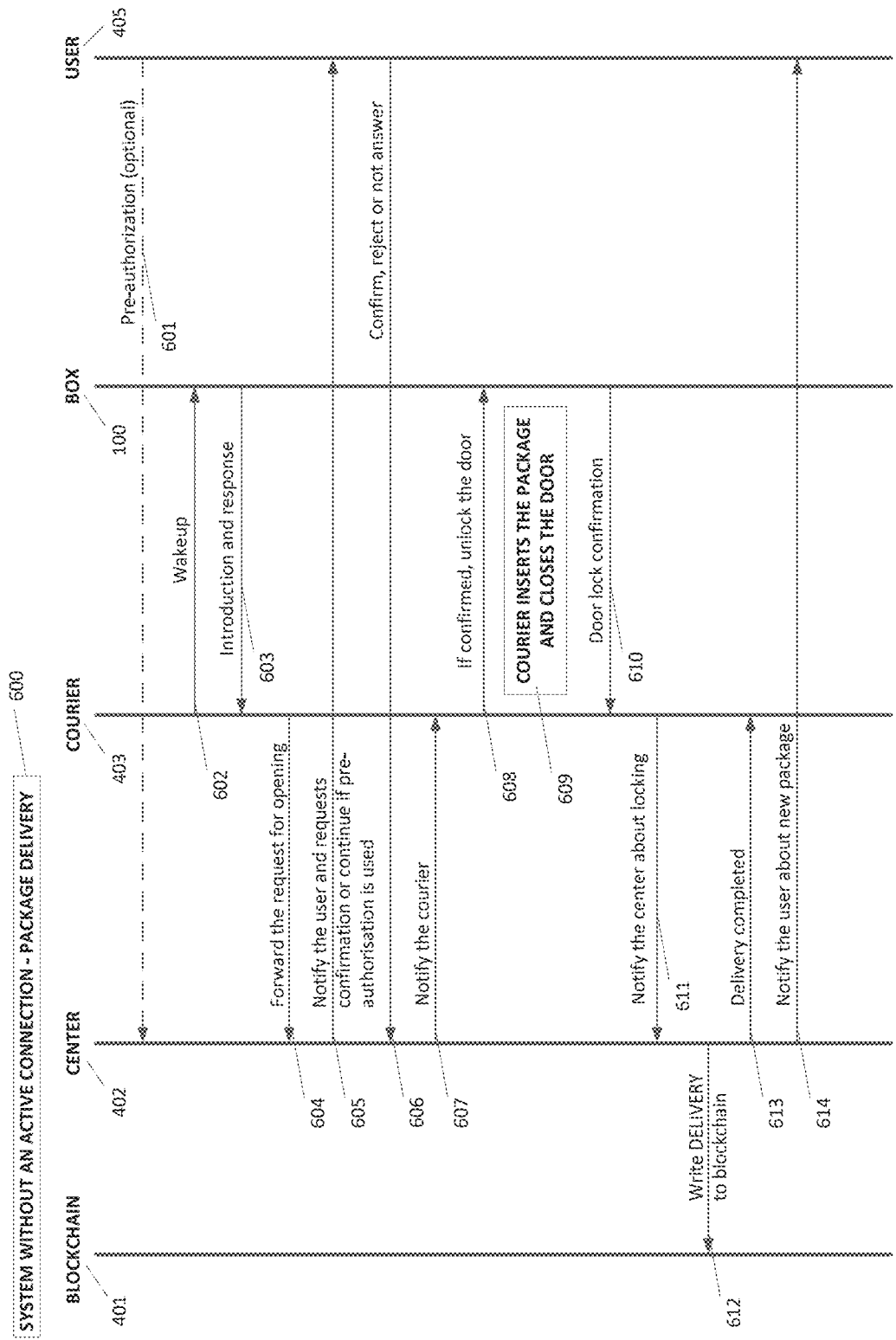
Figure 10:
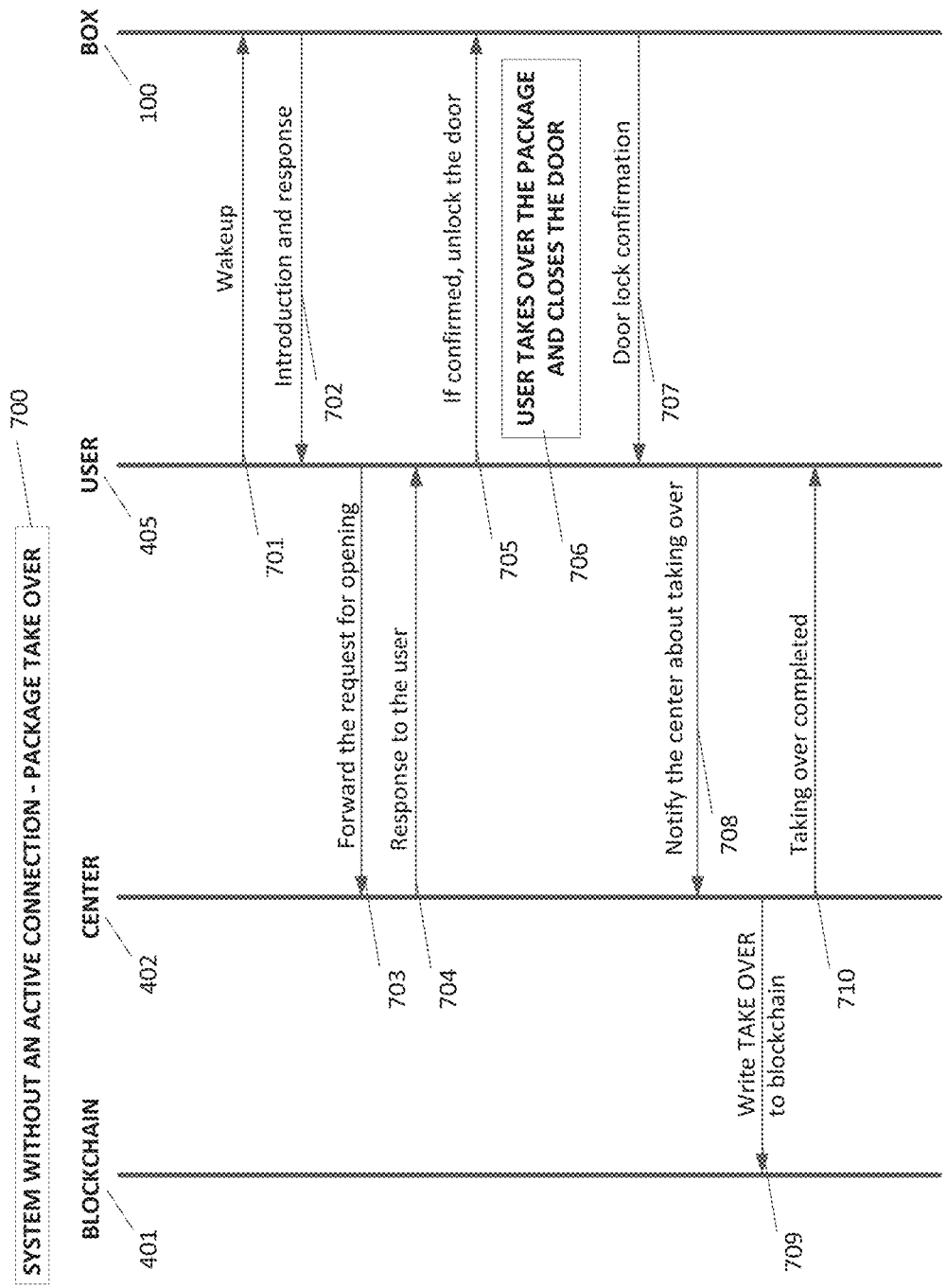
Figure 11:
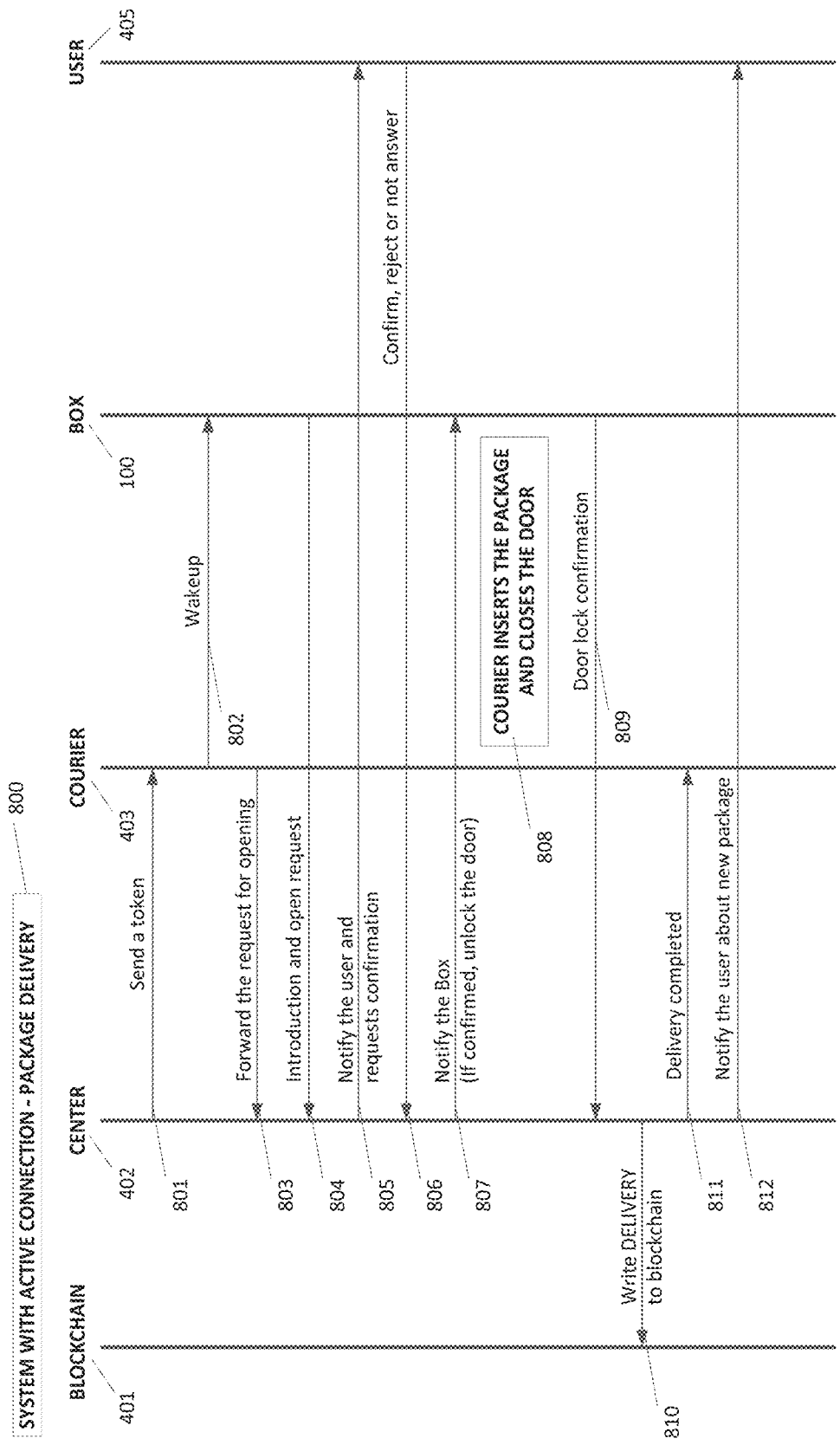

The invention is described in more detail by the following figures:
FIG. 1: Presentation of the basic Box segments;
FIG. 2: Active »Lock system«;
FIG. 3: Contactless communication module »Proximity Communication Interface«;
FIG. 4: Back-end system of the Box;
FIG. 5: Smart mobile device;
FIG. 6: Ordinary mobile phone;
FIG. 7: Presentation of a Multi-Box system;
FIG. 8: Third-party authorization;
FIG. 9: System without an active connection—package delivery;
FIG. 10: System without an active connection—package delivery;
FIG. 11: System with an active connection—package delivery; and
FIG. 12: System with an active connection—package delivery.

DETAILED DESCRIPTION

FIG. 1 is a schematic presentation of the basic Box (100) components of one exemplary embodiment of the invention, where a system for energy harvesting and storage (101) charges the internal battery; sensors system (102) enables different functions, such as weighing, taking photographs and other modes of acquiring data on the inserted delivery; external power supply (103) (optionally) enable connection of additional external power supply; active communication (104) for communicating with the back-end system (400) or directly with the »Courier« (403) and/or the »User« (405) and the central processing unit (lock system) (200), which manages the operation of all system segments.

The active communication module (104) may be a wireless module such as a GSM/3G/LTE module, and/or a TCP/IP direct access module, and/or a WiFi module, and/or a Lora module, and/or a LoRaWAN module. Alternatively, a box may have a different connection such as a landline DSL connection, or a local connection to a router or telephone/internet network.

FIG. 2 is a schematic presentation of the central processing unit lock system (200), which functions with an internal CPU processor (201) and locks or unlocks the electro mechanical lock (202); containing the proximity communication interface (300), which enable contactless communication with the »Courier« (403) and/or the »User« (405);

contains all needed links to the system for energy harvesting and storage (101), sensors system (102), external power supply (103) and active communication module (104). The box may generally be completely energetically self-sufficient or connected to external power supply, if necessary.

FIG. 3 is a schematic presentation of the proximity communication interface (300), using microphone which is a part of the audio system (301); smart optical tag (302) which enables two-way communication using the camera and the flash of the User's smart mobile device; E-INK display (303) or any other display unit which enables generation of dynamic QR codes and thus sending information to the User's smart mobile device; an NFC contactless module (304) which enables contactless communication with the NFC module of the User's smart mobile device; a proximity transceiver (305) which with the help of ZigBee, Bluetooth or another similar wireless interface also enables communication with the User's smart mobile device; and a serial communication port (306) which expands the universality of the master lock system (200), as different external sensors, actuators or modules (e.g. temperature, humidity, air pressure and weight sensors, video capturing, different controls, etc.) can be connected to it. a microphone or an audio system (301), FIG. 4 is a schematic presentation of the back-end software solution (400) residing on a server system, introducing blockchain (401) technology as the core of this decentralized system in which several user systems confirm the same information, thus preventing all persons involved from arbitrarily and retroactively modifying the content of recorded transactions, which allows for permanency and stability of entered data; complete server cloud platform (402) which control the entire operation; »Courier« (403) who deliver the shipment; »User A« (405) and/or »User B« (406) who is the recipient of the shipment; Box (100); and Multi-Box (1000).

FIG. 5 is a schematic presentation of the smart mobile device (1100), where communication modem (1101) enables communication with the back-end software solution (400) through a currently existing wireless technology (e-g GSM/LTE network, Wi-Fi or direct IP network, etc.); an NFC module (1102), which enables contactless communication with the Box (100) and/or Multi-Box (1000); a mobile application (1103) which enables user interaction with all the functions supported within any given version of the mobile application; and acoustic assembly (1104) which includes the speaker and the microphone of the smart mobile device (1100), enabling DOV (Data Over Voice) communication with the Box (100) and/or Multi-Box (1000). Communication between the box/multi-box, the center and any user device may be coded or encrypted in all communication segments or only part of it. Communication may be implemented in a digital form with the use of wireless or contactless connection between the Box (100) and/or Multi-Box system (1000) and a smart mobile device (1100) and/or and ordinary mobile phone (1200).

The system may operate in a mode with an active connection (800), (900) and/or in the mode without an active connection (600), (700) between the »Courier« (403), the »User« (405), the Box (100) and the Center (402). Thus, a box and different users may communicate with them directly or through the »Center« (402) using a mobile application (1103) on a smart mobile device (1100) or using an ordinary mobile phone (1200).

FIG. 6 is a schematic presentation of the ordinary mobile phone (1200), where communication modem (1201) enables communication with the back-end software solution (400) through a currently existing wireless technology (e-g GSM/LTE network, Wi-Fi or direct IP network, etc.); and acoustic assembly (1202) which includes the speaker and the microphone of the smart mobile device (1200), enabling DOV (Data Over Voice) communication with the Box (100) and/or Multi-Box (1000).

FIG. 7 is a schematic presentation of a Multi-Box (1000) system, which is a flexible structure of a large number of mailboxes (100), where only one active communication (104) and one (optional) external power supply (103) are needed, while each Box (100) within a Multi-Box (1000) has its own other components.

Process Diagrams

To make the text clearer and easier to grasp, the diagrams described in patent claims and shown in FIGS. 8-12 using actual names of individual entities in information paths, although communication between the »Courier« (403) or the »User« (405) and the »Center« (402) runs through a mobile application (1103) on a smart mobile device (1100) and/or ordinary mobile phone (1200).

6. Third-Party Authorization

As shown in FIG. 8, a special procedure of granting third-party authorization to take over the package has the following specific characteristics:

Step 1: The Center (402) notifies User A (405), who is the receiving party of the new package, about a new delivery, (501), Step 2: User A (405) creates a third-party authorisation for User B (406), (502), Step 3: The Center (402) notifies User B (405) about the new authorization, (503), Step 4: User B (406) responds to the Center (402) with an accept or reject answer, (504), Step 5: If User B (406) accepts the authorization, the Center (402) writes an AUTHORIZATION transaction to the blockchain (401), (505), Step 6: The Center (401) informs User A (405) of the decision about the authorization, (506).

7. System without an Active Connection—Package Delivery

FIG. 9 is a process diagram for a system without an active connection for a package delivery:

Step 1: The User (405) optionally performs pre-authorization, (601),

Step 2: The Courier (403) wakes up the Box (404) using one of the wake-up means available, (602), Step 3: The Box (404) responds to the Courier (403) and introduces itself, (603), Step 4: The Courier (403) forwards a request for opening the door with all the necessary information, (604) to the Center (402), Step 5: The Center (402) notifies the User (405) about a new package delivery and requests confirmation for opening the Box (404) door, (605), Step 6: If pre-authorization in step (601) is used, the Center (402) directly notifies the Courier (403) and unlocks the Box (404) door, (607), (608), Step 7: The Center (402) notifies the Courier (403) and unlocks the Box (404) door if the User (405) approved the opening, (606), (608), Step 8: The Courier (403) inserts the package into the Box (404) and locks the door, (609), Step 9: The Box (404) sends door lock confirmation to the Courier (403), (610), Step 10: The Courier (403) notifies the Center (402) about door locking, (611), Step 11: The Center (402) writes DELIVERY transaction to the blockchain (401), (612), Step 12: The Center (402) informs the Courier (403) that the delivery has been successfully completed, (613), Step 13: The Center (402) notifies the User (405) about a new package in his/her Box (404), (614).

8. System without an Active Connection—Package Delivery

FIG. 10 is a process diagram for a system without an active connection.

Step 1: The User (405) wakes up the Box (404) using one of the wake-up means available, (701), Step 2: The Box (404) responds to the User (405) and introduces itself, (702), Step 3: The User (405) forwards the request to the Center (402) for opening the door with all the necessary information, (703), Step 4: The Center (402) responds to the User (405) with approval, if unlock conditions are met, (704), Step 5: If confirmed, the User (405) unlocks the Box (404) door, (705), Step 6: The User (405) takes over the package from Box (404) and locks the door, (706), Step 7: The Box (404) sends door lock confirmation to the User (405), (707), Step 8: The User (405) notifies the Center (402) about taking over the package, (708), Step 9: The Center (402) writes the TAKE OVER transaction to the blockchain (401), (709), Step 10: The Center (402) informs the User (405) that the take-over of the package has been successfully completed, (710).

9. System with an Active Connection— Package Delivery

FIG. 11 is a process diagram for a system with an active connection—package delivery:

Step 1: The Center (402) sends a token to the Courier (403), (801),

Step 2: The Courier (403) wakes up the Box (404) using one of the wake-up means available, (802), Step 3: The Courier (403) forwards a request for opening the door with all the necessary information to the Center (402), (803), Step 4: The Box (404) also forwards open request to the Center (402) and introduces itself, (804), Step 5: The Center (402) notifies the User (405) about a new package delivery and requests confirmation for opening the Box (404) door, (805), Step 6: The User (405) can confirm, reject or not answer to the open request, (806), Step 7: The Center (402) notifies the Box (404) about the User's (405) decision and if it is confirmed, the Box (404) unlocks its door, (807), Step 8: The Courier (403) inserts the package into the Box (404) and locks the door, (808), Step 9: The Box (404) sends door lock confirmation to the Center (402), (809), Step 10: The Center (402) writes the DELIVERY transaction to the blockchain (401), (810), Step 11: The Center (402) informs the Courier (403) that the delivery has been successfully completed, (811), Step 12: The Center (402) notifies the User (405) about a new package in his/her Box (404), (812).

10. System with an Active Connection—Package Take Over

Figure 12:
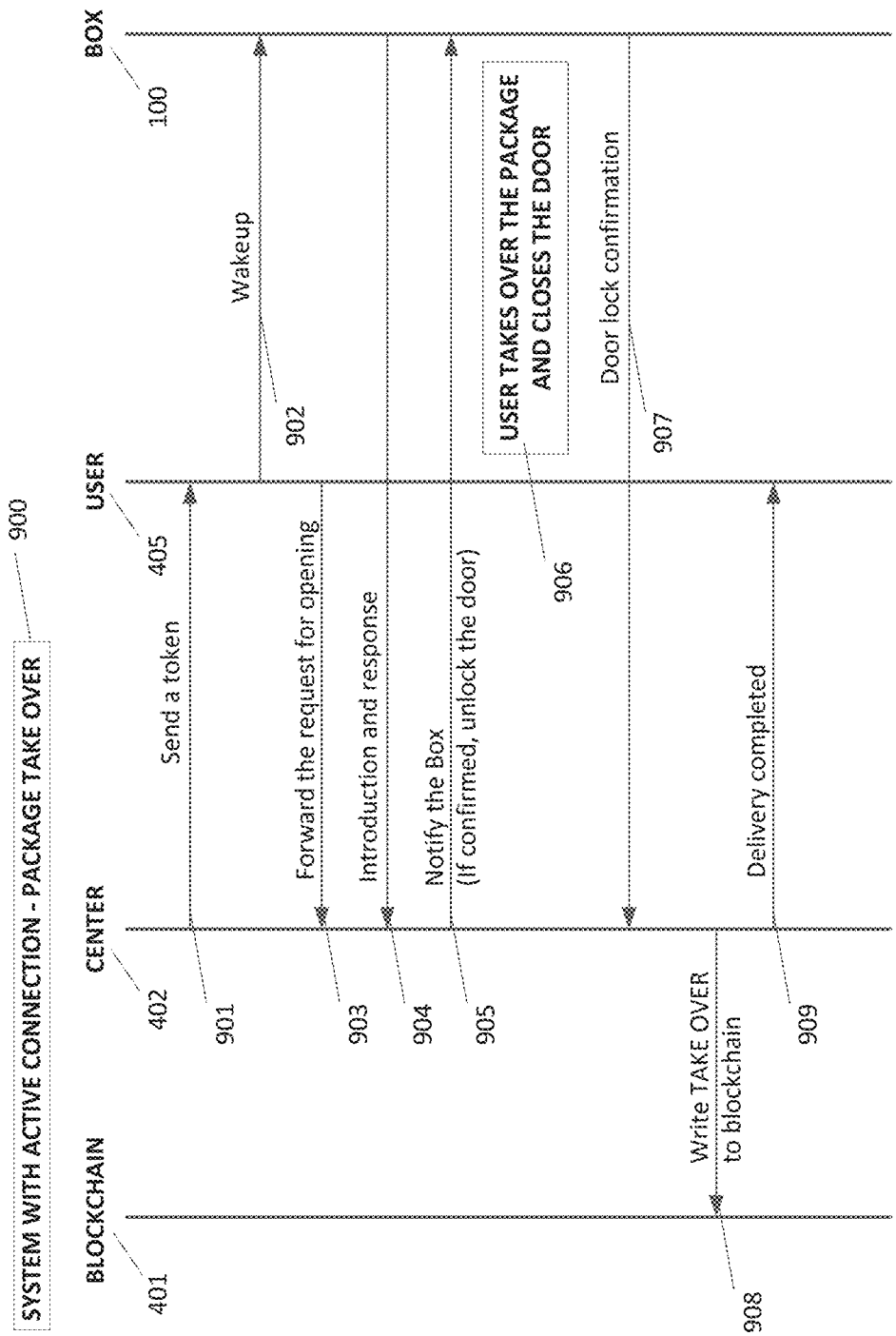

FIG. 12 is a process diagram for System with an active connection—package delivery:

Step 1: The Center (402) sends a token to the User (405), (901),

Step 2: The User (405) wakes up the Box (404) using one of the wake-up means available, (902), Step 3: The User (405) forwards request for opening the door with all the necessary information to the Center (402), (903), Step 4: The Box (404) also forwards open request to the Center (402) and introduces itself, (904), Step 5: The Center (402) responds to the Box (404) with approval, if unlock conditions are met, (905), Step 6: The User (405) takes over the package from Box (404) and locks the door, (906), Step 7: The Box (404) sends door lock confirmation to the Center (402), (907), Step 8: The Center (402) writes the TAKE OVER transaction to the blockchain (401), (908), Step 9: The Center (402) informs the User (405) that the take-over of the package has been successfully completed, (909).

Obviously, many modifications and variations of the present invention are possible in light of the above teachings. It is, therefore, to be understood that the invention may be practiced otherwise than as specifically described while still being within the scope of the invention.

The invention claimed is:

1. A secure locker box (100) comprising:
a central processing lock system (200) for locking said secure locker box (100), said central processing lock system (200) including a processing unit (201), an electro mechanical lock (202) for locking and unlocking a door of the secure locker box (100), a wireless communication module (300), an active communication module (104), a proximity sensors system (102), enabling automatic identification of a package in said secure locker box (100) via a RFID reader, and an energy harvesting and storage system (101) and an external power supply (103) for electrical energy supply,
   wherein said central processing lock system (200) operates to receive a wakeup signal via said wireless communication module (300);
   send a request for opening said electro mechanical lock (202);
   in response to receiving an unlock confirmation message, open said electro mechanical lock (202);
   recognize closing of said electro mechanical lock (202) and in response sending a door lock confirmation message;
   wherein said secure locker box (100) operates to communicate with a mobile user device (1100) using said wireless communication module (300), and wherein said request for opening, said unlock confirmation message, and said door lock confirmation message is transmitted and/or received and/or forwarded by said mobile user device (1100) towards/from a remote locker box center (402),
   wherein said mobile user device (1100) comprises an acoustic assembly (1104), which includes a speaker and a microphone of said mobile user device (1100), enabling Data Over Voice communication with said secure locker box (100);
   wherein said active communication module (104) transmits and/or receives said request for opening, said unlock confirmation message, and said door lock confirmation message towards/from the remote locker box center (402); and
   wherein said wireless communication module (300) comprises a Smart Optical Tag (302), enabling communication using said mobile user device (1100).

2. The secure locker box (100) according to claim 1, wherein said active communication module (104) is
- a GSM/3G/LTE module and/or
- a TCP/IP direct access module and/or
- a WiFi module and/or
- a Lora module and/or
- a LoRaWAN module.

3. The secure locker box (100) according to claim 1, wherein said wireless communication module (300) comprises at least one of the following:
- a microphone or audio system (301);
- a display element (303);
- a wireless interface (304);
- a proximity transceiver (305), and
- a serial communication interface (306).

4. A secure locking system, comprising at least one secure locker box (100) according to claim 1, and a remote locker center (402), wherein the system operates in a mode with and/or without an active connection between a courier (403), a user (405), the secure locker box (100) and the remote locker center (402), wherein said remote locker center (402) operates to communicate with said at least one secure locker box (100) either directly or via messages transmitted to and from a mobile user device (1100), wherein said remote locker center (402) operates to write a confirmation of a locker box (100) process to a blockchain by cryptographically generating a new block based on a previous block of said blockchain and said confirmation.

5. The secure locking system according to claim 4, wherein said locker box (100) process is one of a box (100) authorization, a user authentication, a successful box (100) opening, a transfer of authorization to a second user (406), for said at least one secure locker box (100), such that said confirmation written to said blockchain ensures authenticity of said locker box (100) process.

6. A method for operating the secure locking system according to claim 1, comprising:
- at the secure locker box (100), detecting a wakeup signal, (602, 701, 802, 902);
- sending a request for opening a door, (402/605, 703, 803/804/805, 903/904), wherein the secure locker box (100) can optionally be actively connected to a cloud-based back-end facility, or the secure locker box (100) can reply passively on a communication link provided by an agent's connected mobile user device (1100);
- in response to receiving an unlock confirmation message (606/607, 704, 806, 905), actuating said electro mechanical lock (202) such that the secure locker box (100) opens said central processing lock system (200), (608, 705, 807);
- recognize closing of said electro mechanical lock (202), (609, 706, 808, 906) and in response sending a door lock confirmation message (610, 707, 809, 907).

7. The method according to claim 6, wherein said request for opening is received by a remote locker center (402), and wherein said remote locker center (402) checks said request and transmits said unlock confirmation message.

8. The method according to claim 6, wherein said secure locker box (100) transmits said messages to a user device using said wireless communication interface, and wherein said user device transmits or forwards said message towards or from said secure locker center (402).

* * * * *